(12) United States Patent
Melzer et al.

(10) Patent No.: US 12,072,435 B2
(45) Date of Patent: Aug. 27, 2024

(54) CASCADED RADIO FREQUENCY SYSTEM

(71) Applicant: Infineon Technologies AG, Neubiberg (DE)

(72) Inventors: Alexander Melzer, Neutillmitsch (AT); Francesco Lombardo, Munich (DE)

(73) Assignee: Infineon Technologies AG, Neubiberg (DE)

( * ) Notice: Subject to any disclaimer, the term of this patent is extended or adjusted under 35 U.S.C. 154(b) by 341 days.

(21) Appl. No.: 17/684,672

(22) Filed: Mar. 2, 2022

(65) Prior Publication Data
US 2022/0308161 A1 Sep. 29, 2022

(30) Foreign Application Priority Data
Mar. 25, 2021 (DE) .......................... 102021107618.8

(51) Int. Cl.
*G01S 7/03* (2006.01)
*G01S 7/35* (2006.01)
*G01S 13/931* (2020.01)
*H04B 1/403* (2015.01)

(52) U.S. Cl.
CPC ................ *G01S 7/032* (2013.01); *G01S 7/35* (2013.01); *G01S 13/931* (2013.01); *H04B 1/403* (2013.01)

(58) Field of Classification Search
CPC . G01S 7/032; G01S 7/35; G01S 13/42; G01S 13/58; G01S 13/931; H04B 1/403
See application file for complete search history.

(56) References Cited

U.S. PATENT DOCUMENTS

| | | | | |
|---|---|---|---|---|
| 10,684,363 B2* | 6/2020 | Starzer | ................... | G01S 7/032 |
| 2010/0171648 A1* | 7/2010 | Himmelstoss | ............ | H03L 7/16 |
| | | | | 342/103 |
| 2013/0278306 A1* | 10/2013 | Wixforth | ................. | H03K 3/01 |
| | | | | 327/299 |
| 2015/0153445 A1* | 6/2015 | Jansen | ................... | G01S 7/032 |
| | | | | 342/195 |
| 2016/0146931 A1* | 5/2016 | Rao | ....................... | G01S 13/931 |
| | | | | 342/59 |
| 2016/0187464 A1* | 6/2016 | Ginsburg | ............... | G01S 13/87 |
| | | | | 342/168 |
| 2017/0023663 A1* | 1/2017 | Subburaj | ................ | G01S 7/036 |
| 2017/0090015 A1* | 3/2017 | Breen | .................... | G01S 7/032 |
| 2018/0175831 A1* | 6/2018 | Reuter | ................ | H01Q 1/2283 |

(Continued)

FOREIGN PATENT DOCUMENTS

DE 102018117688 A1 2/2019

*Primary Examiner* — Peter M Bythrow
(74) *Attorney, Agent, or Firm* — Harrity & Harrity, LLP

(57) ABSTRACT

A cascaded RF system includes a first MMIC and at least a second MMIC. During a first mode of operation: using an LO generation circuit of the first MMIC to generate a first LO signal based on a system clock signal; outputting the first LO signal from an LO output port of the first MMIC; receiving the first LO signal via a first LO input port of the first MMIC; and receiving the first LO signal via a second LO input port of the second MMIC. During a second mode of operation: using an LO generation circuit of the second MMIC to generate a second LO signal based on the system clock signal; and outputting the second LO signal from an LO output port of the second MMIC to a first LO input port of the second MMIC and to a second LO input port of the first MMIC.

18 Claims, 2 Drawing Sheets

(56) References Cited

U.S. PATENT DOCUMENTS

| | | | |
|---|---|---|---|
| 2019/0187273 A1* | 6/2019 | Tong | G01S 7/032 |
| 2019/0204846 A1* | 7/2019 | Reuter | G01S 7/4004 |
| 2020/0025899 A1* | 1/2020 | Starzer | G01S 7/352 |
| 2020/0096603 A1* | 3/2020 | Schmidt | G01S 7/032 |

* cited by examiner

CASCADED RADIO FREQUENCY SYSTEM

RELATED APPLICATION

This application claims priority to German Patent Application No. 102021107618.8, filed on Mar. 25, 2021, which is incorporated herein by reference in its entirety.

FIELD

The present disclosure generally relates to cascaded radio frequency (RF) systems and, more particularly, to fail-safe operation of cascaded RF systems.

BACKGROUND

In the context of radar monolithic microwave integrated circuits (MMICs), so-called "cascaded systems" have emerged, whereby multiple MMICs are interconnected to embody a single overall system with increased resolution for radar target discrimination. The multiple MMICs are interconnected by a distributed local oscillator (LO) signal from a master MMIC. The LO signal may typically come from an LO generation circuit of the master MMIC, such as a phase locked loop (PLL) circuit.

For a cascaded system, a so-called fail-safe operation mode is when one MMIC is not functional anymore, e.g., due to a permanent fault or over-temperature. For example, when the LO generation circuit of the master MMIC becomes dysfunctional, one of the slave MMICs may become the new master providing the LO signal. This way, even with a failure, the cascaded system can perform radar measurements with reduced performance.

The skilled person having benefit from the present disclosure will appreciate that cascaded systems may not only be relevant for radar applications but also for other cascaded radio frequency (RF) systems relying on multiple cascaded RF MMICs.

Thus, there may be a demand for improved cascaded RF systems, in particular with regards to fail-safe operation of such systems.

SUMMARY

This demand is met by apparatuses and methods in accordance with the independent claims Some beneficial embodiments are addressed by the dependent claims.

According to a first aspect, the present disclosure proposes a cascaded RF system. The cascaded RF system includes a first (RF—) MMIC and at least a second (RF—) MMIC. The first MMIC includes an LO generation circuit configured to generate a first LO signal based a system clock signal during a first mode of operation of the cascaded RF system. The first MMIC includes an LO output terminal configured to output first the LO signal during the first mode of operation. The first MMIC includes a first LO input terminal for receiving the first LO signal during the first mode of operation. The first MMIC includes a second LO input terminal for receiving a second LO signal during a second mode of operation of the cascaded RF system. The second MMIC of the cascaded RF system includes an LO generation circuit configured to generate the second LO signal based on the system clock signal during the second mode of operation. The second MMIC includes an LO output terminal configured to output the second LO signal during the second mode of operation. The second MMIC includes a first LO input terminal for receiving the second LO signal during the second mode of operation. The second MMIC includes a second LO input terminal for receiving the first LO signal during the first mode of operation.

The proposed cascaded RF system uses two LO input terminals (ports) per MMIC. This way, in case the first MMIC acting as master MMIC has a failure, the second MMIC, previously acting as slave MMIC, can take over as master for the cascaded RF system. This allows to support a fail-safe operation.

In some embodiments, the first and the second MMICs are configured to operate their respective transmitter (Tx) and receiver (Rx) circuits based on the first LO signal during the first mode of operation (e.g., first MMIC acts as master, second MMIC acts as slave) and to operate their respective Tx and Rx circuits based on the second LO signal during the second mode of operation (e.g., second MMIC acts as master, first MMIC acts as slave). Thus, the respective transceiver functionalities of the MMICs may remain essentially unaffected if the first MMIC fails to generate and deliver a proper first LO signal for the cascaded RF system.

In some embodiments, the first MMIC includes a system clock input terminal for receiving a system clock signal. The system clock signal may stem from an external clock signal generation circuit including, for example, a crystal oscillator circuit. The first MMIC may include a clock output terminal for relaying or forwarding the system clock signal. The first MMIC may also include a clock input terminal coupled to the clock output terminal. Thus, the first MMIC may self-feed the system clock signal from its clock output terminal to its clock input terminal. The second MMIC may include a clock input terminal coupled to the clock output terminal of the first MMIC. Thus, the first MMIC may feed the system clock signal from its clock output terminal to the clock input terminal of the second MMIC. Note that the system clock signal is different from the first and second LO signals. The first and second LO signals may be generated based on the (stable) system clock signal.

In some embodiments, the cascaded RF system may further include a first signal path between the LO output terminal and the first LO input terminal of the first MMIC and a second signal path between the LO output terminal of the first MMIC and the second LO input terminal of the second MMIC. The first and the second signal paths may be of the same length, thus leading to same signal propagation delays for the first LO signal along the two signal paths. The same signal propagation delays for the first LO signal along the two signal paths may enable perfectly synchronized transmit and receive signals of the first and second MMIC during the first mode of operation.

In some embodiments, the cascaded RF system may further include a first signal path between the LO output terminal and the first LO input terminal of the second MMIC and a second signal path between the LO output terminal of the second MMIC and the and the second LO input terminal of the first MMIC. The first and the second signal paths may be of the same length, thus leading to same signal propagation delays for the second LO signal along the two signal paths. The same signal propagation delays for the second LO signal along the two signal paths may enable perfectly synchronized transmit and receive signals of the first and second MMIC during the second mode of operation.

In some embodiments, the first and the second LO input terminals of the first MMIC are on opposite sides of the first MMIC. Likewise, the first and the second LO input terminals of the second MMIC are on opposite sides of the second MMIC. This allows for good signal routing and distribution properties.

In some embodiments, the first MMIC and the second MMIC are arranged on a printed circuit board (PCB) such that the first LO input terminal of the first MMIC and the second LO input terminal of the second MMIC face in opposite directions. Again, this may support good signal routing and distribution properties as well as a space saving arrangement of the MMICs.

In some embodiments, the first LO input terminal of the first MMIC and the second LO input terminal of the second MMIC face each other. Again, this may support efficient signal routing and distribution properties as well as space saving arrangement of the MMICs on a PCB.

In some embodiments, the cascaded RF system may further include a control circuit configured to detect a state of failure of the LO generation circuit of the first MMIC. The control circuit may be configured to switch from the first mode of operation to the second mode of operation of the cascaded RF system in case of failure. The skilled person having benefit from the present disclosure will appreciate that the control circuit may be internal to the first and/or second MMIC as well as external to (e.g., separate from) the MMICs.

In some embodiments, the first and second MMICs are radar MMICs, respectively. For example, the cascaded radar MMICs may be implemented as frequency-modulated continuous-wave (FMCW) radar MMICs operating in at 77 GHz, for example.

In some embodiments, the first and the second MMIC form a first MMIC subsystem. The cascaded RF system may further include a second MMIC subsystem including a third MMIC and a fourth MMIC. The third MMIC includes an LO generation circuit configured to generate a third LO signal based on the system clock signal during the second mode of operation. The third MMIC includes an LO output terminal configured to output third the LO signal during the second mode of operation. The third MMIC includes a first LO input terminal for receiving the third LO signal during the second mode of operation. The third MMIC includes a second LO input terminal for receiving the first LO signal during the first mode of operation. The fourth MMIC includes an LO generation circuit configured to generate a fourth LO signal based on the system clock signal. The fourth MMIC includes an LO output terminal. The fourth MMIC includes a first LO input terminal for receiving the third LO signal during the second mode of operation. The fourth MMIC includes a second LO input terminal for receiving the first LO signal during the first mode of operation. If the first MMICs fails as master MMICs, the second and third MMICs can take over an act as master MMICs for their respective MMIC subsystems.

According to a further aspect, the present disclosure proposes a vehicle including the cascaded RF system of any one of the previous embodiments. Cascaded radar systems in accordance with embodiments of the present invention may be particularly useful as sensor systems in cars. Such radar sensor systems may be a baseline for autonomous driving functionalities.

According to yet a further aspect, the present disclosure proposes a radar MMIC. The radar MMIC includes an LO generation circuit configured to generate a first LO signal based on a system clock signal. The radar MMIC includes an LO output terminal configured to output the first LO signal. The radar MMIC includes a first LO input terminal for receiving the first LO signal during a first mode of operation. The radar MMIC includes a second LO input terminal for receiving a second LO signal from another radar MMIC during a second mode of operation.

In some embodiments, the radar MMIC is configured to operate its transmitter and receiver circuitry based on the first LO signal during the first mode of operation (e.g., first MMIC acts as master, second MMIC acts as slave) and to operate its transmitter and receiver circuitry based on the second LO signal during the second mode of operation (e.g., second MMIC acts as master, first MMIC acts as slave). Thus, the transceiver functionalities of the MMIC may remain essentially unaffected if the MMIC fails to generate and deliver a proper first LO signal.

In some embodiments, the first and the second LO input terminals are arranged on opposite sides of the radar MMIC. This allows for efficient signal routing and distribution properties on a PCB.

In some embodiments, the radar MMIC includes a first and a second clock input terminal for receiving a system clock signal. The first clock input terminal may be for receiving an external system from a crystal oscillator circuit, for example. The second clock input terminal may be coupled to a clock output terminal for self-feeding the system clock signal.

The present disclosure proposes a concept to enable fail-safe operation of a cascaded RF system using two LO input ports of the MMICs.

BRIEF DESCRIPTION OF THE DRAWINGS

Some examples of apparatuses and/or methods will be described in the following by way of example only, and with reference to the accompanying figures, in which.

DETAILED DESCRIPTION

Figure 1:
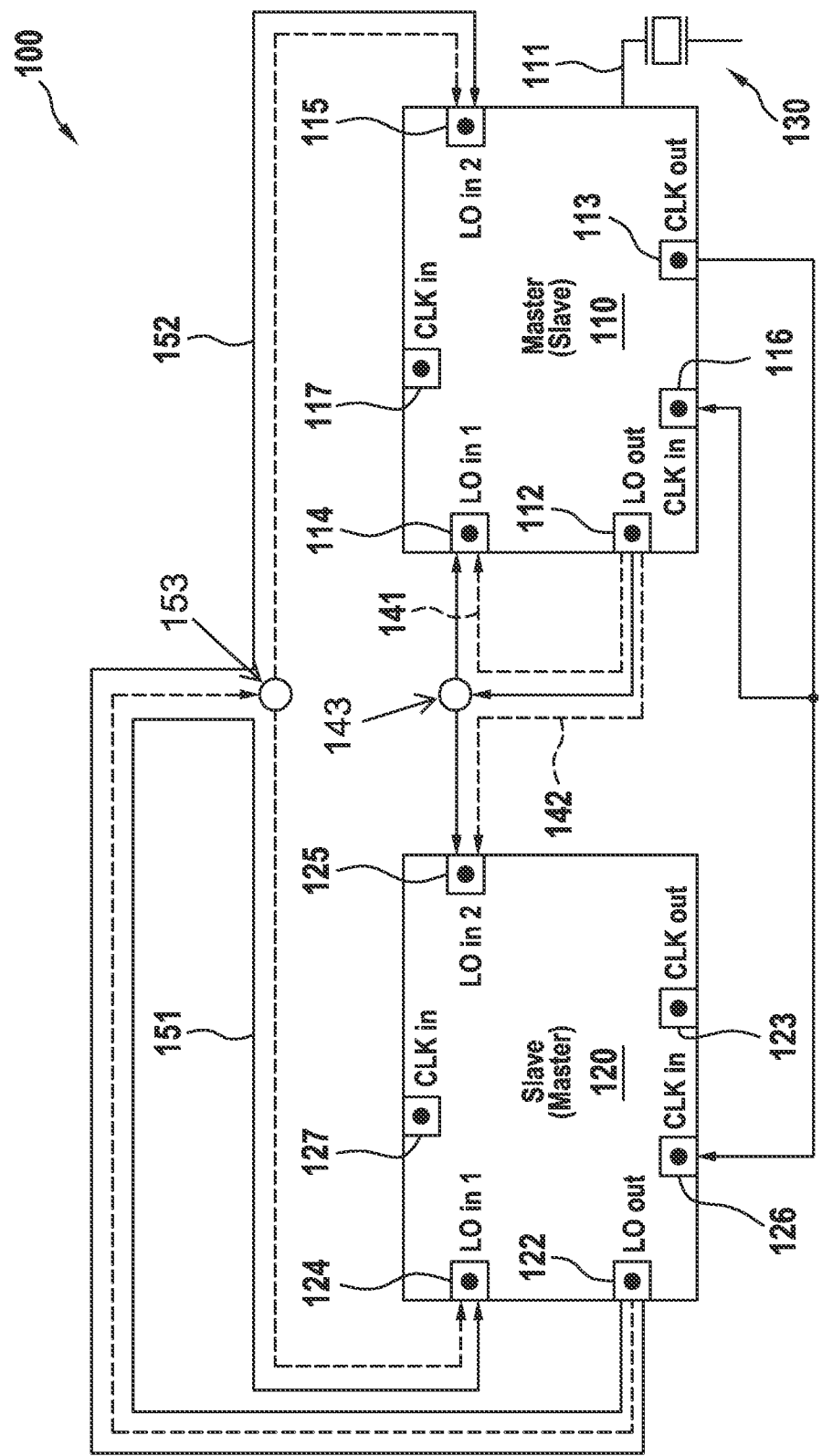
FIG. 1 illustrates a schematic block diagram of a cascaded RF system with two RF-MMICs.

Some examples are now described in more detail with reference to the enclosed figures. However, other possible examples are not limited to the features of these embodiments described in detail. Other examples may include modifications of the features as well as equivalents and alternatives to the features. Furthermore, the terminology used herein to describe certain examples should not be restrictive of further possible examples.

Throughout the description of the figures same or similar reference numerals refer to same or similar elements and/or features, which may be identical or implemented in a modified form while providing the same or a similar function. The thickness of lines, layers and/or areas in the figures may also be exaggerated for clarification.

When two elements A and B are combined using an 'or', this is to be understood as disclosing all possible combinations, i.e., only A, only B as well as A and B, unless expressly defined otherwise in the individual case. As an alternative wording for the same combinations, "at least one of A and B" or "A and/or B" may be used. This applies equivalently to combinations of more than two elements.

If a singular form, such as "a", "an" and "the" is used and the use of only a single element is not defined as mandatory either explicitly or implicitly, further examples may also use several elements to implement the same function. If a function is described below as implemented using multiple elements, further examples may implement the same function using a single element or a single processing entity. It is further understood that the terms "include", "including", "comprise" and/or "comprising", when used, describe the presence of the specified features, integers, steps, operations, processes, elements, components and/or a group thereof, but do not exclude the presence or addition of one or more other features, integers, steps, operations, processes, elements, components and/or a group thereof.

Automotive radars, along with other environmental sensors such as lidar, ultrasound, and cameras, are one of the backbones of self-driving cars and advanced driver assistant systems (ADASs). These technological advancements are enabled by complex systems with signal processing paths from radars/sensors to one or more controllers. Automotive radar systems enable the detection of objects and obstacles, their position, and speed relative to a vehicle. The development of signal processing techniques along with progress in the millimeter-wave (mm-wave) semiconductor technology plays a key role in automotive radar systems. Various signal processing techniques have been developed to provide better resolution and estimation performance in all measurement dimensions: range, azimuth-elevation angles, and velocity of the targets surrounding the vehicles.

For frequency-modulated continuous-wave (FMCW) radar systems, for example, it is known to obtain information on range, speed, and angles by performing multiple Fast Fourier Transforms (FFTs) on samples of radar mixer outputs. A first FFT, also commonly referred to as range FFT, yields range information. A second FFT across the range transformed samples, also commonly referred to as Doppler FFT, yields speed information. The first and second FFTs yield a so-called 2D range-Doppler map comprising range and speed (FFT) bins. A third FFT involving phase information of signals of different antenna elements of an (virtual) antenna array can yield additional spatial or angular information—so-called Direction-of-Arrival (DoA) information.

MIMO (Multi Input Multi Output) is widely used to enlarge effective radar aperture size by synthesizing a virtual receiver array by combination of physically implemented multiple transmitter channels and multiple receiver channels. To synthesize virtual array information from limited physical arrays, separation of reflected signals received at each receiver channel from different transmitters is an important procedure in MIMO technology. In view of this, the number of receive channels in a radar system is continuously increasing. On the other side, the number of RF pins on a radar Monolithic Microwave Integrated Circuit (MMIC) is limited by the power dissipation and by the number of pins. Thus, automotive radars may combine or cascade more and more MMIC devices to handle increasing numbers of Tx/Rx channels.

FIG. 1 illustrates a schematic block diagram of a cascaded RF system 100 according to an embodiment of the present disclosure. The skilled person having benefit from the present disclosure will appreciate that the cascaded RF system 100 may be used as a cascaded radar system.

The cascaded RF system 100 comprises a first RF-MMIC 110 and a second RF-MMIC 120. The first and the second RF-MMICs 110, 120 may each comprise one or more Tx and Rx channels (not shown). By cascading the Tx and/or Rx channels of the RF-MMICs 110, 120 an aperture of the resulting synthesized virtual array can be increased.

The first MMIC 110 comprises an LO generation circuit (not shown) which is configured to generate a first LO signal based on a system clock signal 111 during a first mode of operation of the cascaded RF system 100. The system clock signal 111 may be generated externally from the RF-MMICs 110, 120. For example, the system clock signal 111 may be generated by a crystal oscillator circuit as indicated by reference numeral 130. In the embodiment illustrated in FIG. 1, the system clock signal 111 is input to the first MMIC 110 where it can be used to generate the first the LO signal with the LO generation circuit of the first MMIC 110. For example, the first the LO generation circuit may comprise an analog or digital PLL circuit using the system clock signal 111 as a base for generating the first LO signal. In some embodiments, the LO generation circuit of the first MMIC 110 may be configured to generate the first LO signal as FMCW signal for FMCW radar applications. The skilled person having benefit from the present disclosure will appreciate that the LO generation circuit may include one or more phase detectors, low-pass filters, voltage-controlled oscillators (VCOs), feedback paths, and the like.

The first MMIC 110 comprises an LO output terminal 112 coupled to its (internal) LO generation circuit and configured to output the first LO signal during the first mode of operation. In the illustrated embodiment, the first MMIC 110 also comprises a system clock output terminal 113 configured to relay or forward the system clock signal 111 received from the external crystal oscillator circuit 130 to the second MMIC 120. In the first mode of operation, the first MMIC 110 may be considered as a master MMIC providing the first LO signal and the system clock signal 111 to the second MMIC 120, acting as a slave MMIC during the first mode of operation.

The first MMIC 110 of the cascaded RF system 100 further comprises a first LO input terminal 114 for receiving the first LO signal from its LO output terminal 112 during the first mode of operation. That is to say, the first MMIC 110 feeds the first LO signal from its LO output terminal 112 to its own LO input terminal 114 during the first mode of operation (self-feeding). The first LO input terminal 114 may be coupled to Tx/Rx (transceiver) circuitry of the first MMIC 110 to operate respective Tx and Rx circuitry based on the first LO signal during the first mode of operation. The transceiver circuitry may comprise power amplifiers for one or more Tx channels as well as interfaces to one or more Tx antennas. The transceiver circuitry of the first MMIC 110 may further comprise interfaces to one or more Rx antennas as well as low noise amplifiers (LNAs) and one or more analog to digital converters (DACs) for converting analog Rx signals to digital Rx signals for further processing (e.g., FFT processing).

In accordance with embodiments of the present disclosure the first MMIC 110 also comprises a second LO input terminal 115 for receiving a second LO signal during a second mode of operation of the cascaded RF system 100. Also, the second LO input terminal 115 may be coupled to the Tx/Rx (transceiver) circuitry of the first MMIC 110 to operate respective Tx and Rx circuitry based on the second LO signal during the second mode of operation. As will be seen further below, the second LO signal may originate from the second MMIC 120 in the second mode of operation. In the second mode of operation, the second MMIC 120 may be considered as a master MMIC providing the second LO signal to the first MMIC 110. Distinguished from the first mode of operation, the first MMIC 110 acts as a slave MMIC during the second mode of operation. The second mode of operation may also be referred to as fail-safe mode.

The second MMIC 120 comprises a respective LO generation circuit (not shown) which is configured to generate, during the second mode of operation, the second LO signal based on the system clock signal 111 (forwarded from the first MMIC 110). The system clock signal 111 from the first MMIC 110 may be input to a system clock input terminal 126 of the second MMIC 120. To this end, the system clock input terminal 126 of the second MMIC 120 may be coupled to the system clock output terminal 113 of the first MMIC 110 for system clock relaying. As can be seen from the embodiment shown in FIG. 1, the system clock signal 111 may not only be fed from the system clock output terminal 113 of the first MMIC 110 to the system clock input terminal 126 of the second MMIC 120, but also to a system clock input terminal 116 of the first MMIC 110 (self-feeding). Thus, the first MMIC 110 may forward the system clock signal 111 from its output terminal 113 to its own system clock input terminal 116 as well as to other MMICs of the cascaded RF system. As in the first MMIC 110, the LO generation circuit of the second MMIC 120 may comprise a PLL circuit, for example, to generate the second LO signal based on the system clock signal 111 as clock reference.

The second MMIC 120 further comprises an LO output terminal 122 configured to output the second LO signal during the second mode of operation. A possible signal routing for the second mode of operation is shown by the dashed routing lines in FIG. 1.

In the same manner as the first MMIC 110, also the second MMIC 120 comprises a first LO input terminal 124 for receiving the second LO signal from its own LO output terminal 122 during the second mode of operation. During the second mode of operation, the second MMIC 120 may feed its own LO signal from its LO output terminal 122 to its own LO input terminal 124. The first LO input terminal 124 may be coupled to Tx/Rx (transceiver) circuitry of the second MMIC 120 to operate respective Tx and Rx circuitry based on the second LO signal during the second mode of operation.

The second MMIC further comprises a second LO input terminal 125 for receiving the first the LO signal from the first MMIC 110 during the first mode of operation. The second LO input terminal 125 may be coupled to Tx/Rx (transceiver) circuitry of the second MMIC 120 to operate respective Tx and Tx circuitry based on the first LO signal during the first mode of operation.

The present disclosure thus proposes a redundant signal routing concept between the first MMIC 110 and the second MMIC 120. While during the first mode of operation, which may also be referred to as normal mode of operation, the first MMIC 110 may provide its first LO signal to itself (LO input terminal 114) and to the second MMIC 120 (LO input terminal 125), the second MMIC 120 may provide its second LO signal to itself (LO input terminal 124) and to the first MMIC 120 (LO input terminal 115) during the second mode of operation, which may also be referred to as fail-safe mode. This may be useful in case the LO generation circuit of the first MMIC 110 experience of failure or a misbehavior while other parts (e.g. system clock generation and distribution, RX/TX channels) of the first MMIC are still functional. In such a case the master MMIC role for the LO generation and distribution may be transferred from the first MMIC 110 to the second MMIC 120. Then the second MMIC 120 may act as the new master MMIC and provide its second LO signal to itself and the first MMIC 110, which acts as slave during the second mode of operation.

For detecting a failure or a misbehavior of the master MMIC, the cascaded RF system 100 may comprise a control circuit (system controller) which is configured to detect a state of failure of the LO generation circuit of the first MMIC 110 and, in case of failure, to switch from the first mode of operation to the second mode of operation of the cascaded RF system 100. The control circuit may be internal or external to the MMICs 110, 120.

In FIG. 1, the normal LO distribution is shown in solid lines (first mode of operation). In normal mode, the first MMIC 110 acts as master. LO self-feeding for the master is realized by feeding back the first LO signal to the master (LO in 1, 114), while the slave MMIC 120 receives the first LO signal via LO in 2 (reference numeral 125). A coupler or power splitter may be used in order to split the first LO signal for feeding back to the master and simultaneously to the slave. In some examples the coupler or power splitter is arranged symmetrical such that a signal path for LO self-feeding has the same length as the signal path for LO feeding to the slave. In case, e.g., the PLL of the master MMIC 110 cannot lock anymore due to a permanent failure, the slave MMIC 120 may be reconfigured to function as master. The LO distribution in this fail-safe mode is then provided as shown by the dashed lines. The reconfiguration of the MMICs may be executed by a system controller (not shown) by properly changing the in- and outputs of the master and slave MMICs used for LO distribution. Radar data may be received unchanged on the same ports from the MMICs, e.g., via low voltage differential signaling (LVDS) or Camera Serial Interface 2 (CSI-2). Accordingly, the first and the second radar MMICs 110, 120 are configured to operate respective Tx and Rx circuitry based on the first LO signal (from the first MMIC 110) during the first mode of operation and to operate respective Rx and Tx circuitry based on the second LO signal (from the second MMIC 110) during the second mode of operation. Note that the original master 110 is assumed to still operate with the basic functionality needed to generate the CLK out (system clock distribution).

As can be seen from FIG. 1, the layout of the first MMIC 110 and the second MMIC 120 may be identical. Both MMICs 110, 120 include a respective internal LO generation circuit configured to generate a respective LO signal based on the system clock signal 111. Both MMICs 110, 120 include a respective LO output terminal 112, 122 to output the respective LO signals during the first or the second mode of operation. Both MMICs include respective first LO input terminals 114, 124 and respective second LO input terminals 115, 125. The first LO input terminal 114 of the first MMIC 110 and the second LO input terminal 125 of the second MMIC may be used for receiving the first LO signal from the first MMIC 110 during the first mode of operation. The first LO input terminal 124 of the second MMIC 120 and the second LO input terminal 115 of the first MMIC 110 may be used for receiving the second LO signal from the second MMIC 120 during the second mode of operation.

In both MMICs 110, 120 the respective first and second LO input terminals may be arranged—in a top view of the MMICs—on opposite sides of the respective MMIC 110, 120. For the first MMIC 110, the first LO input terminal 114 may be located on the left side of the first MMIC 110, while the second LO input terminal 115 may be located on the right side of the first MMIC 110. Similarly, the first LO input terminal 124 of the second MMIC 120 may be arranged on the left side of the second MMIC 120, while the second LO input terminal 125 of the second MMIC 120 may be arranged on the right side of the second MMIC 120. Such a geometry may be useful for an efficient and phase synchronous signal routing of the respective LOL signals as it allows in the second mode of operation (fail-safe mode) to maintain the length of the signal paths for the self-feeding and the feeding to the slave symmetrical, as described above for the first mode of operation.

In the illustrated example of FIG. 1, the first MMIC 110 and the second MMIC 120 are arranged on a PCB such that the first LO input terminal 114 of the first MMIC 110 and the second LO input terminal 125 of the second MMIC 120 face in opposite directions. Here, the first LO input terminal 114 of the first MMIC 110 and the second LO input terminal 125 of the second MMIC 120 face each other since the MMICs 110, 120 are arrange side by side (MMIC 100 right, MMIC 120 left). The skilled person having benefit from the present disclosure will appreciate that also other locations of the respective first and second LO input terminals may be feasible. For example, the respective first and second LO input terminals may be arranged on the lower and upper sides of the respective MMICs 110, 120.

As can be observed from FIG. 1, the first and second MMICs 110, 120 may each include at least one system clock input terminal 117, 127 in addition to the respective system clock input terminals 116, 126 for more flexible signal routing options and arrangements on a PCB. The respective second system clock input terminals 117, 127 may also be coupled to the respective internal LO generation circuits for providing the system clock signal 111 as clock reference.

The cascaded RF system 100 of FIG. 1 includes a first signal path (first signal routing) 141 between the LO output terminal 112 of the first MMIC 110 and its first LO input terminal 114. A second signal path (second signal routing) 142 may be provided between the LO output terminal 112 of the first MMIC 110 and the second LO input terminal 125 of the second MMIC 120. The first and the second signal paths 141 and 142 are essentially the same length. This may ensure that, during the first mode of operation, the first LO signal of the first MMIC 100 is provided to the first MMIC 110 and the second MMIC 120 with essentially the same signal propagation delay and thus without any significant phase differences. Synchronous operation of the MMICs 110, 120 may thus be achieved. With the above-described cascaded RF system, symmetrical feeding to master and slave with equal signal propagation delays can also be ensured during the second mode of operation. For this purpose, the cascaded RF system 100 further comprises a first signal path 151 between the LO output terminal 122 and the first LO input terminal 124 of the second MMIC 120. A second signal path 152 is provided between the LO output terminal 122 of the second MMIC 120 and the second LO input terminal 115 of the first MMIC 110. Again, the signal paths 151 and 152 are essentially of the same length. This ensures that, during the second mode of operation, the second LO signal from the second MMIC 120 is distributed among the MMICs 110, 120 with essentially the same signal propagation delay and thus the same signal phase.

The signal paths 141, 142 and 151, 152 each comprise a common portion extending from the respective LO output terminals 112, 122 to splitters 143, 153 where the signal paths split. The splitters or power dividers 143, 153 may be implemented as passive splitter circuits. In one example implementation, the splitters 143, 153 may be implemented as Wilkinson power dividers as a specific class of power divider circuit that can achieve isolation between its output ports while maintaining a matched condition on all ports. It uses quarter wave transformers, which can be fabricated as quarter wave lines on printed circuit boards. It is also possible to use other forms of transmission line (e.g., coaxial cable) or lumped circuit elements (inductors and capacitors).

Figure 2:
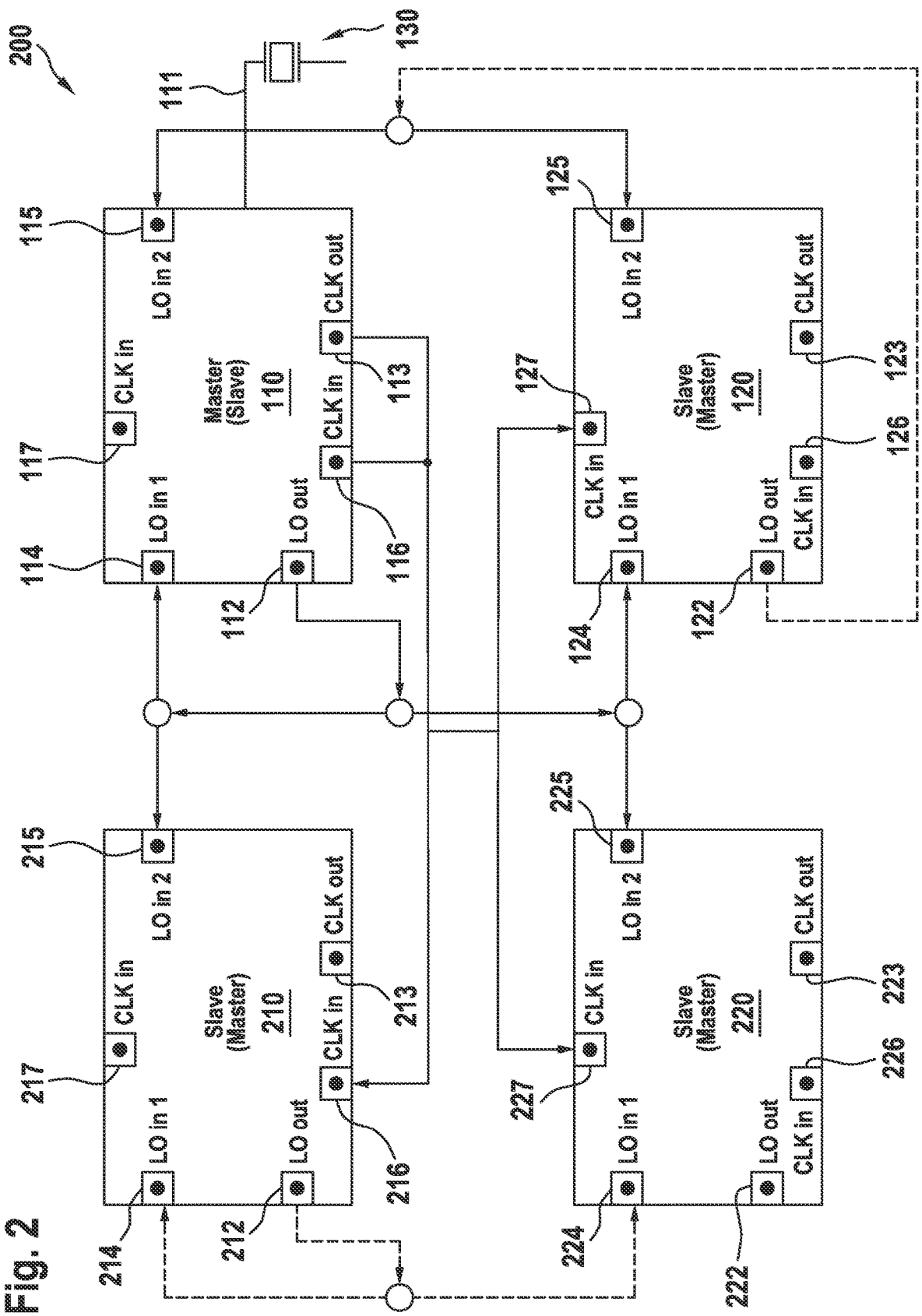
FIG. 2 illustrates a schematic block diagram of a cascaded RF system with four RF-MMICs.

The proposed concept with MMICs having two LO input ports, respectively, can be extended to more than two cascaded MMICs e.g., four cascaded MMICs, with even more benefits. FIG. 2 shows a cascaded RF system 200 comprising four MMICs.

RF-MMICs 110, 120, 210 and 220 form a single cascaded RF system during the normal operation mode (first operation mode). As will be described later, during the fail-safe mode, RF-MMICs 110, 120 of cascaded RF system 200 form a first subsystem and RF-MMICs 210, 220 cascaded RF system 200 form a second subsystem of the cascaded RF system 200. Signal distribution in normal mode is again shown in solid lines, and fail-safe operational LO distribution is shown in dashed lines.

The system clock signal 111 may be generated by crystal oscillator circuit 130 and fed to first MMIC 110. MMIC 110 may output and forward the system clock signal 111 via its system clock output terminal 113. From the system clock output terminal 113, the system clock signal may be fed to system clock input terminal 116 of MMIC 110 (self-feeding), to system clock input terminal 127 of second MMIC 120 (arranged below first MMIC 110), to system clock input terminal 216 of third MMIC 210 (arranged left from first MMIC 110), and to system clock input terminal 227 of fourth MMIC 220 (arranged below third MMIC 210).

During normal mode, first MMIC 110 may act as master MMIC and generate a first LO signal (e.g., FMCW signal) based on the system clock signal 111. The first LO signal may be output via the LO output terminal 112 of first MMIC 110. This first LO signal may then be distributed among the four MMICs 110, 120, 210, and 220 along signal paths of equal lengths. The first LO signal of the master MMIC 110 may be fed into the first LO input terminal 114 of first MMIC 110 and into the first LO input terminal 124 of second MMIC 120. Further, the first LO signal from MMIC 110 may be fed into the second LO input terminal 215 of third MMIC 210 and into the second LO input terminal 225 of fourth MMIC 220. Power splitters or couplers may be used for feeding the first LO signal to the various MMICs 110, 120, 210, and 220. As shown in FIG. 2, a first Power splitter or coupler may be used to split the first LO signal into a first and second LO replica signal for the first and second subsystem. For each of the first and second subsystem, the respective LO replica signals are split by additional power splitters or couplers to obtain for each of the MMICs a respective replica of the first LO signal. During normal mode, the MMICs 110, 120, 210, and 220 may be configured to operate their respective Tx and Rx circuitries based on the first LO signal delivered from master MMIC 110.

In case of a failure of the LO generation circuit of master MMIC 110, the cascaded RF system 200 may switch to a fail-safe mode. In the fail-safe mode, second MMIC 120 may be reconfigured as new master MMIC for the first subsystem comprising MMICs 110 and 120. Further, third MMIC 210 may be configured as master MMIC for the second subsystem comprising MMICs 210 and 220. In the fail-safe mode, the output of the first LO signal via LO output terminal 112 of the MMIC 110 is disabled. In examples, the system clock may still be distributed in the fail-safe mode via the system clock output terminal 113 of MMIC 110 taking into account that parts of the MMIC including the system clock distribution are still functioning. During fail-safe mode the LO generation circuit of second MMIC 120 generates a second LO signal which is output via the LO output terminal 122 of MMIC 120. The second LO signal is then fed to the second LO input terminal 115 of first MMIC 110 and to the second LO input terminal 125 of MMIC 120 along respective signals paths of ideally the same length. For the second subsystem, third MMIC 210 takes over as new master and generates a third LO signal via its respective LO generation circuit based on the system clock signal 111 forwarded from first MMIC 110. The third LO signal is then output via the LO output terminal 212 of third MMIC 210. The third LO signal is provided from LO output terminal 212 to the first LO input terminal 214 of MMIC 210 and to the first LO input terminal of MMIC 220 along signal paths of essentially the same length. Ideally, the signal paths for distributing the LO signals in the two subsystems are all the same length. In case the length of the signal paths differ, a slight performance degradation with respect to normal mode may be accepted or calibration and/or compensation methods can be used to compensate for the difference in signal path lengths.

It is to be noted that in the normal operation, all RX and TX channels of MMICs 110, 120, 210, 220 can be synchronized via the first LO signal allowing a MIMO operation of all channels. In the fail-safe mode, RX and TX channels of the first subsystem including the MMICs 110, 120 can be synchronized by the transmission of the second LO signal allowing a MIMO operation of the first subsystem. In a same manner, RX and TX channels of the second subsystem including the MMICs 210, 220 can be synchronized by the transmission of the third LO signal allowing a MIMO operation of the second subsystem. Therefore, two non-synchronized cascaded systems having in total the same number of RX and TX channels can be operated in the fail-safe mode. For example, an autonomous driving car utilizing a cascaded radar system as described above may be enabled to utilize the radar system in the fail-save mode to reach a safe location compared to a failure of the complete radar system and potential danger arising therefrom. Even though the performance of cascaded RF system 200 may be slightly reduced during failsafe mode, the availability of the whole system can be significantly increased with the proposed concept compared to conventional cascaded RF systems.

To summarize, the present disclosure proposes to operate a cascaded RF system comprising a first MMIC and at least a second MMIC using the following acts:

During a First Mode of Operation:
using an LO generation circuit of the first MMIC to generate a first LO signal based on a system clock signal; outputting first the LO signal from an LO output port of the first MMIC; receiving the first LO signal via a first LO input port of the first MMIC; and receiving the first LO signal via a second LO input port of the second MMIC;

During a Second Mode of Operation:
using an LO generation circuit of the second MMIC to generate a second LO signal based on the system clock signal; outputting the second LO signal from an LO output port of the second MMIC; receiving the second LO signal via a first LO input port of the second MMIC; and receiving the second LO signal via a second LO input port of the first MMIC.

This may enable fail-safe operation of a cascaded radar system using two LO input ports of the MMICs.

The aspects and features described in relation to a particular one of the previous examples may also be combined with one or more of the further examples to replace an identical or similar feature of that further example or to additionally introduce the features into the further example.

Examples may further be or relate to a (computer) program including a program code to execute one or more of the above methods when the program is executed on a computer, processor, or other programmable hardware component. Thus, steps, operations, or processes of different ones of the methods described above may also be executed by programmed computers, processors or other programmable hardware components. Examples may also cover program storage devices, such as digital data storage media, which are machine-, processor- or computer-readable and encode and/or contain machine-executable, processor-executable, or computer-executable programs and instructions. Program storage devices may include or be digital storage devices, magnetic storage media such as magnetic disks and magnetic tapes, hard disk drives, or optically readable digital data storage media, for example. Other examples may also include computers, processors, control units, (field) programmable logic arrays ((F)PLAs), (field) programmable gate arrays ((F)PGAs), graphics processor units (GPU), application-specific integrated circuits (ASICs), integrated circuits (ICs) or system-on-a-chip (SoCs) systems programmed to execute the steps of the methods described above.

It is further understood that the disclosure of several steps, processes, operations, or functions disclosed in the description or claims shall not be construed to imply that these operations are necessarily dependent on the order described, unless explicitly stated in the individual case or necessary for technical reasons. Therefore, the previous description does not limit the execution of several steps or functions to a certain order. Furthermore, in further examples, a single step, function, process, or operation may include and/or be broken up into several sub-steps, -functions, -processes or -operations.

If some aspects have been described in relation to a device or system, these aspects should also be understood as a description of the corresponding method. For example, a block, device or functional aspect of the device or system may correspond to a feature, such as a method step, of the corresponding method. Accordingly, aspects described in relation to a method shall also be understood as a description of a corresponding block, a corresponding element, a property or a functional feature of a corresponding device or a corresponding system.

The following claims are hereby incorporated in the detailed description, wherein each claim may stand on its own as a separate example. It should also be noted that although in the claims a dependent claim refers to a particular combination with one or more other claims, other examples may also include a combination of the dependent claim with the subject matter of any other dependent or independent claim. Such combinations are hereby explicitly proposed, unless it is stated in the individual case that a particular combination is not intended. Furthermore, features of a claim should also be included for any other independent claim, even if that claim is not directly defined as dependent on that other independent claim.

What is claimed is:

1. A cascaded radio frequency (RF) system, comprising a first monolithic microwave integrated circuit (MMIC) comprising:
 a first local oscillator (LO) generation circuit configured to generate a first LO signal based a system clock signal during a first mode of operation of the cascaded RF system;
 a first LO output terminal configured to output first the LO signal during the first mode of operation;
 a first LO input terminal configured to receive the first LO signal during the first mode of operation; and
 a second LO input terminal configured to receive a second LO signal during a second mode of operation of the cascaded RF system; and
a second MMIC comprising:
 a second LO generation circuit configured to generate the second LO signal based on the system clock signal during the second mode of operation;

a second LO output terminal configured to output the second LO signal during the second mode of operation;

a third LO input terminal configured to receive the second LO signal during the second mode of operation; and a fourth LO input terminal configured to receive the first LO signal during the first mode of operation.

2. The cascaded RF system of claim 1, wherein the first MMIC and the second MMIC are configured to operate respective transmitter and receiver circuitry based on the first LO signal during the first mode of operation and to operate respective transmitter and receiver circuitry based on the second LO signal during the second mode of operation.

3. The cascaded RF system of claim 1, wherein the first MMIC comprises:

an input configured to receive the system clock signal;

a clock output terminal configured to relay the system clock signal; and a first clock input terminal coupled to the clock output terminal, and wherein the second MMIC comprises:

a second clock input terminal coupled to the clock output terminal of the first MMIC.

4. The cascaded RF system of claim 1, further comprising:

a first signal path coupled between the first LO output terminal and the first LO input terminal of the first MMIC; and a second signal path coupled between the first LO output terminal of the first MMIC and the fourth LO input terminal of the second MMIC, wherein the first and the second signal paths are of a same length.

5. The cascaded RF system of claim 1, further comprising a first signal path coupled between the second LO output terminal and the third LO input terminal of the second MMIC; and a second signal path coupled between the second LO output terminal of the second MMIC and the second LO input terminal of the first MMIC, wherein the first and the second signal paths are of a same length.

6. The cascaded RF system of claim 4, wherein the first and the second LO input terminals; of the first MMIC are arranged on opposite sides of the first MMIC, and wherein the third and the fourth LO input terminals of the second MMIC are arranged on opposite sides of the second MMIC.

7. The cascaded RF system of claim 1, wherein the first MMIC and the second MMIC are arranged on a printed circuit board (PCB) to cause the first LO input terminal of the first MMIC and the fourth LO input terminal of the second MMIC to face in opposite directions.

8. The cascaded RF system of claim 1, wherein the first MMIC and the second MMIC are arranged on a printed circuit board (PCB) to cause the first LO input terminal of the first MMIC and the fourth LO input terminal of the second MMIC to face each other.

9. The cascaded RF system of claim 1, further comprising a control circuit configured to detect a state of failure of the first LO generation circuit of the first MMIC and, in case of failure, to switch from the first mode of operation to the second mode of operation of the cascaded RF system.

10. The cascaded RF system of claim 1, wherein the first MMIC comprises a clock output terminal coupled to a second clock input terminal of the second MMIC, wherein the first MMIC is configured to forward the system clock signal to the second MMIC.

11. The cascaded RF system of claim 1, wherein the first and the second MMICs are radar MMICs.

12. The cascaded RF system of claim 1, wherein the first and the second MMICs form a first MMIC subsystem, and wherein the cascaded RF system further comprises a second MMIC subsystem comprising:

a third MMIC comprising:

a third LO generation circuit configured to generate a third LO signal based on the system clock signal during the second mode of operation;

a third LO output terminal configured to output the third LO signal during the second mode of operation;

a fifth LO input terminal for receiving the third LO signal during the second mode of operation; and a sixth LO input terminal for receiving the first LO signal during the first mode of operation; and a fourth MMIC comprising:

a fourth LO generation circuit configured to generate a fourth LO signal based on the system clock signal;

a fourth LO output terminal;

a seventh LO input terminal configured to receive the third LO signal during the second mode of operation; and an eighth LO input terminal configured to receive the first LO signal during the first mode of operation.

13. A vehicle, comprising:

a cascaded radio frequency (RF) system comprising a first monolithic microwave integrated circuit (MMIC) and a second MMIC:

wherein the first MMIC comprises:

a first local oscillator (LO) generation circuit configured to generate a first LO signal based a system clock signal during a first mode of operation of the cascaded RF system;

a first LO output terminal configured to output first the LO signal during the first mode of operation;

a first LO input terminal configured to receive the first LO signal during the first mode of operation; and a second LO input terminal configured to receive a second LO signal during a second mode of operation of the cascaded RF system, and wherein the second MMIC comprises:

a second LO generation circuit configured to generate the second LO signal based on the system clock signal during the second mode of operation;

a second LO output terminal configured to output the second LO signal during the second mode of operation;

a third LO input terminal configured to receive the second LO signal during the second mode of operation; and a fourth LO input terminal configured to receive the first LO signal during the first mode of operation.

14. A radar monolithic microwave integrated circuit (MMIC), comprising:

a local oscillator (LO) generation circuit configured to generate a first LO signal based on a system clock signal;

an LO output terminal configured to output the first LO signal;

a first LO input terminal configured to receive the first LO signal during a first mode of operation; and a second LO input terminal configured to receive a second LO signal from another radar MMIC during a second mode of operation.

15. The radar MMIC of claim 14, wherein the radar MMIC is configured to operate its transmitter and receiver circuitry based on the first LO signal during the first mode of operation and to operate its transmitter and receiver circuitry based on the second LO signal during the second mode of operation.

16. The radar MMIC of claim 14, wherein the first and the second LO input terminals are arranged on opposite sides of the radar MMIC.

17. The radar MMIC of claim 14, further comprising a first clock input terminal and a second clock input terminal configured to receive the system clock signal.

18. The cascaded RF system of claim 5, wherein the first and the second LO input terminals of the first MMIC are arranged on opposite sides of the first MMIC, and wherein the third and the fourth LO input terminals of the second MMIC are arranged on opposite sides of the second MMIC.

* * * * *